United States Patent [19]
Failon et al.

[11] Patent Number: 6,063,290
[45] Date of Patent: May 16, 2000

[54] METHOD FOR CONTROLLING SCALE USING SYNERGISTIC PHOSPHONATE BLENDS

[75] Inventors: Brian K. Failon; Robert G. Gabriel, both of Richmond, Va.

[73] Assignee: Albright & Wilson Americas Inc., Glen Allen, Va.

[21] Appl. No.: 09/237,160

[22] Filed: Jan. 25, 1999

Related U.S. Application Data

[63] Continuation-in-part of application No. 09/164,811, Oct. 1, 1998.

[51] Int. Cl.⁷ .......................................... C02F 5/14

[52] U.S. Cl. ............................ 210/699; 252/180

[58] Field of Search .................................. 210/699, 700; 252/180

[56] References Cited

U.S. PATENT DOCUMENTS

| | | | |
|---|---|---|---|
| 3,723,333 | 3/1973 | Von Freyhold | 210/700 |
| 3,909,447 | 9/1975 | Redmore et al. | 210/699 |
| 3,959,168 | 5/1976 | Germscheid et al. | 252/180 |
| 5,409,614 | 4/1995 | Gallup et al. | 210/700 |

FOREIGN PATENT DOCUMENTS 0089189  9/1983  European Pat. Off. .

*Primary Examiner*—David A. Simmons
*Assistant Examiner*—Frank M. Lawrence
*Attorney, Agent, or Firm*—Frishauf, Holtz, Goodman, Langer & Chick, P.C.

[57] ABSTRACT

The present invention is a process of treating aqueous systems to prevent precipitation of dissolved metal ion species, for example, Ca, Mg, Ba, Cu, Fe, Mn and Zn. This has the effect of preventing scale and/or stain formation. The process involves introducing 0.5 to 15000 ppm (or mg/liter) of a synergistic mixture of HEDP and DETPMP into the aqueous system to be treated.

18 Claims, No Drawings

METHOD FOR CONTROLLING SCALE USING SYNERGISTIC PHOSPHONATE BLENDS

This is a continuation-in-part application of application Ser. No. 09/164,811 filed Oct. 1, 1998, which is incorporated herein by reference.

BACKGROUND OF THE INVENTION

The invention relates to a series of new multifunctional inhibitors especially for industrial scale inhibition application. In particular, the invention relates to the use of a synergistic blend of phosphonates to prevent the formation of scale in aqueous systems by sequestration (or chelation) of various metal ions or by the so-called threshold inhibition reaction.

The components of the blend are known agents for scale control. Although these agents have various chemical names, depending inter alia on the field of use, their usual names and abbreviations in this field are 1-hydroxyethylidene-1,1-diphosphonic acid (abbreviated herein as HEDP); and diethylenetriaminepenta (methylenephosphonic acid) (abbreviated herein as DETPMP).

Mixtures of HEDP and DETPMP have been used on a limited commercial basis in textile preparation formulas primarily for alkaline peroxide bleach bath stabilization (serving a metal chelation function).

Mixtures of DETPMP and ATMP (aminotri (methylenephosphonic acid)) are also known, e.g. from UK 1,563,521, for a relatively narrow set of applications, all pertaining to cleaning surfaces with a dilute solution of alkali metal hydroxide (i.e. NaOH and phosphonate).

A sequestration (or chelation) agent works by forming a soluble (aqueous) metal-ligand complex. Chelating ties up the ion and prevents it from reacting to form a less soluble species. The chelation reaction is a stoichiometric reaction.

A threshold agent acts to prevent crystal nucleation from supersaturated salt solutions (aqueous). Since crystallization is a dynamic, reversible reaction, when one direction of the reaction is stopped, the net result is that the crystal may redissolve, releasing the threshold reagent back into solution. This is a sub-stoichiometric reaction requiring relatively small amounts of agent, relative to stoichiometric reaction requirements, to maintain a supersaturated solution.

The concentrations noted are the concentration for scale inhibition. In some special circumstances, e.g. oil well "squeeze" treatment (see discussion in U.S. Pat. No. 5,755,972)—an "infiltrating" solution is used at a much higher concentration in order to infiltrate the underground petroleum bearing formations. Thereafter, the anti-scaling agent leaches out over time to maintain the required concentrations in the water being treated. Additional infiltration treatment of the formations are made as required, to maintain leaching rates sufficient to maintain effective concentrations of the composition in the water being treated, to prevent scale formation.

Concentrations are given either in ppm by weight or in mg/liter. For most purposes, they can be used interchangeably. However, in high brine (or salt) concentration situations where the weight of the solution is substantially greater than for water, mg/liter is preferably used.

BRIEF SUMMARY OF THE INVENTION

A synergistic mixture of HEDP:DETPMP may be used in relatively small amounts to prevent the precipitation of various materials from aqueous solution by chelation of metal species (i.e. Fe, Mn, Ca) and/or scale inhibition (i.e. $CaCO_3$, $CaSO_4$, and/or $BaSO_4$) in, for example, the following applications: potable water, swimming pool, mining, desalination (based on evaporative distillation of seawater), geothermal well, pulp bleach stabilization, mining, oilfield, bar soap, and/or cooling water.

Synergy in the context of this invention is shown, for example, 1) if performance achieved with a fixed concentration of the HEDP:DETPMP blend exceeds that of the same concentration of HEDP and that of the same concentration of DETPMP, synergy has been demonstrated; or 2) if a fixed, desirable performance level is achieved by a lower concentration of the HEDP:DETPMP blend than by either of the components, synergy has been demonstrated.

Useful mixtures of HEDP:DETPMP can range in ratios by weight of from 4:1 to 1:5 mixtures. However, best results are at approximately (4 to 2):1 or 1:(4 to 2) with ratios of approximately 3:1 or 1:3 being preferred.

Amounts of the mixture typically required are 0.3 to 50 ppm (as the sum of active species) more usually 0.5 to 50 ppm depending on how the mixture is being used and the expected metal ion content of the water being treated. For high scaling situations, dosages in the range of 25–50 ppm (or mg/liter for high brine conditions) of the mixture will typically be used. However, under certain extreme conditions, as is sometimes found, for example, in oilfield applications, concentrations of up to 500 ppm (or mg/liter) or possibly more should be used for effective scale control. Very high dosages of up to 15000 ppm are useful for water used in timber processing or milling, e.g. 500 to 15000 ppm although from a cost effectiveness basis more preferably 2000 to 10000 ppm for example approximately 8000 ppm.

As usual in this field, all concentrations, including ratios of components, disclosed in this application are by weight and refer to the active components or the so-called "actives." The term "actives" is used in this field to refer to the material itself. It is usual to dilute the HEDP and the DETPMP with water in order to facilitate handling, mixing, pumping, and accurate dosing. Thus, 50 ppm HEDP means 50 ppm of the actual component (e.g. 100% HEDP) and not of any dilution thereof.

It is usual to report dosage amounts as ppm by weight. However, where extremely high scaling conditions caused by high "brine" concentration are present, "mg/liter" is sometimes used as appropriate in place of ppm by weight and is usually used in the oil production field where high brine concentrations are found in the wells. The two are substantially the same under low "brine" concentration conditions but, in the case where the concentration of dissolved salts is high, the weight of the solution is greatly increased and, therefore, amounts as mg/liter are used even though ppm may be specified, to ensure appropriate concentration of anti-scaling agents. For the purposes herein, "mg/liter" is used where it is usually appropriate (i.e. high brine concentration). High brine conditions are conditions where the dissolved solids are at least about 8% by weight of the solution.

DETAILED DESCRIPTION OF THE INVENTION

It is contemplated that the present invention will have a wide range of utility as chelating and threshold agents. The threshold inhibition mechanism and associated substoichiometric treatment, applies to systems where there are counterions in solution which create the potential for precipitation of the metal-anion salt. The chelating mechanism, and associated stoichiometric treatment, applies to systems where the metal ion (cation) alone is problematic. Because the invention is a synergistic mixture it may be used in relatively small amounts and still effectively prevent the precipitation of various materials from aqueous solution by chelation. These include metal species (Fe, Mn, Ca) and/or scale producing species ($CaCO_3$, $CaSO_4$, and/or $BaSO_4$). The invention can find wide use in aqueous system such as potable water, swimming pool, mining, desalination (based on evaporative distillation of seawater), geothermal well, pulp bleach stabilization, cement setting retarders (e.g. by preventing calcium or iron from precipitating), lumber processing water to prevent dissolved iron from staining the lumber, mining, oilfield, bar soap, and/or cooling water (e.g. cooling towers).

Useful mixtures of HEDP:DETPMP can range from 4:1 to 1:5 mixtures, preferably (4 to 2):1 or 1:(4 to 2), and most preferably about 1:3 or 3:1.

Because of the synergistic effect, amounts as low as 0.3 ppm are sufficiently effective to be useful in situations where small amounts are desirable (or required) e.g., municipal water systems. For most uses, it would not be expected that more than 50 ppm will be required. Amounts of 0.5 to 50 ppm would generally be more usual, depending on how the mixture is being used and the expected metal ion content, or degree of supersaturation with respect to a given scalant species, of the water being treated. For high scaling situations, dosages in the range of 5–50 ppm will typically be used, although dosages up to about 500 ppm or even up to 15000 ppm or greater may be necessary under extraordinary scaling situations. Where high scaling is due to high brine conditions, e.g. under harsh oilfield conditions, concentrations should be specified in mg/liter units e.g. 5–50 mg/liter up to 500 mg/liter.

Applicants believe that the synergistic effect which occurs in the sequestering action results from the complementary action of the two agents used. HEDP has two relatively closely spaced sites for chelating. DETPMP is a bulkier molecule with five sites more widely spaced, for chelating. Thus, for example, on an iron ion which may have five sites, the two chelating agents may act together. It is also possible for a chelating agent to act on more than one molecule simultaneously depending on the configuration and where other sites of the molecules are being chelated. Also, adding to the synergistic effect of the combination are dispersant effects of the large (DETPMP) molecule and crystal modification effects of the smaller HEDP molecule. However, irrespective of the actual mechanisms involved, the combined result is surprisingly good as compared with the use of each component separately.

The products are effective in the presence of chlorine, chlorine dioxide, bromine, hypochlorite, hypobromite and other oxidizing biocides. They are therefore used to treat chlorinated water systems or systems sterilized by other oxidizing agents. They are useful in cooling water treatment, treatment of process waters, boiler water treatment, desalination plant and for treating water used or produced in oil wells including injection water, produced water, and water used for hydrostatic testing of pipelines.

For example, the compounds and mixtures of the invention may be used in squeeze treatment of oil wells, or may be added to drilling muds or to oilfield injection water, produced water or water for hydrostatic testing, as well as to various industrial cooling waters and process waters and to water for use in central heating systems, where they are effective in preventing e.g. calcium carbonate scale. Under harsh oilfield conditions such as described, for example, by Hann et al. in U.S. Pat. No. 5,755,972, incorporated herein by reference, concentrations up to about 500 mg/liter (high brine conditions) may be useful to control scaling. For preventing stain by deposition of iron compounds on lumber being milled, the water used in the milling can contain amounts up to about 15000 ppm or more. As shown in the testing below, excellent results can be obtained even at relatively low concentrations.

The mixtures are also useful in treating chlorinated water systems for which many threshold agents are ineffective. Effective concentrations may typically range from 0.3 to 50 ppm or 0.3 to 100 ppm depending on the nature of the aqueous system, preferably 0.5 to 20 ppm, especially 5 to 10 ppm.

Mixtures according to the present invention are also useful for potable water in municipal water systems where the synergistic effect allows meeting Environmental Standards (restricting the usage to low concentration), while still getting effective activity.

Depending on use, mixtures according to the invention may be used in combination with one another, and/or in conjunction with other water treatment agents including: surfactants, such as anionic surfactants (e.g. $C_{10-20}$ alkyl benzene sulfonates, $C_{10-20}$ olefin sulfonates, $C_{10-20}$ alkyl sulfates, $C_{10-20}$ alkyl 1 to 25 mole ether sulfates, $C_{10-20}$ paraffin sulfonates, $C_{10-20}$ soaps $C_{10-20}$ alkyl phenol sulfates, sulfosuccinates, sulfosuccinamates, lignin sulfonates, fatty ester sulfonates, $C_{10-20}$ alkyl phenyl ether sulfonates, $C_{10-20}$ alkyl ethanolamide sulfates, $C_{10-20}$ alpha sulfo fatty acid salts, $C_{10-20}$ acyl sarcosinates, isethionates, $C_{10-20}$ acyl taurides, $C_{10-20}$ alkyl hydrogen phosphates), non-ionic surfactants (e.g. ethoxylated and/or propoxylated $C_{10-20}$ alcohols, ethoxylated and/or propoxylated $C_{10-20}$ carboxylic acids, alkanolamides, amine oxides, alkyl phenols, and/or $C_{10-20}$ sorbitan and/or glyceryl ethoxylates) amphoteric surfactants (e.g. betaines, sulfobetaines, and/or quaternized imidazolines) and/or cationic surfactants (e.g. benzalkonium salts, $C_{10-20}$ alkyl trimethyl ammonium salt, and/or $C_{1020}$ alkyl trimethyl or tris(hydroxymethyl) phosphonium salts); other sequestrants and chelating agents, corrosion inhibitors and/or other threshold agents (e.g. sodium tripolyphosphate, sodium [ethylenediamine] tetraacetate, sodium nitrilo triacetate, tetra potassium pyrophosphate, ethylenediamine tetrakis (methylenephosphonic acid) and its salts, tolyltriazole and mixtures of nitrate, benzoate, biocides (e.g. tetrakis (hydroxymethyl) phosphonium salts, formaldehyde, glutaraldehyde; oxidizing biocides and/or bleaches (e.g. chlorine, chlorine dioxide, hydrogen peroxide, sodium perborate); foam controlling agents such as silicone antifoams; oxygen scavengers such as hydrazines and/or hydroxylamines; pH controlling and/or buffering agents such as amines, borates, citrates and/or acetates; chromium salts; zinc salts; molybdates; and/or other water treatment agents such as polymeric dispersants and coagulants (including polymaleic, polyacrylic and polyvinylsulfonic acids and their salts, starches and/or carboxy methyl cellulose.

The invention provides formulations for use in the invention treatment processing to provide an effective amount of the mixture of the invention as aforesaid and any of the aforesaid known water treatment agents. Such formulations may, for example, contain from 5 to 95% by weight of a product of the invention and from 5 to 90% by weight of one or more of any of the aforesaid water treatment agents.

Evaluation of the synergistic mixtures were performed in accordance with the following tests. It is noted that these are usual test procedures for evaluating the activity of water treatment agents. For most purposes, a 90% inhibition or retention of metal ions in the solution is the target result for commercial use and, therefore, a dosage that produces about 90% result is optimal from a practical point of view, taking cost and the need to use as little as possible additives for environmental reasons as well as situations where the dosed product is to be ingested (e.g. potable water).

The following testing (except experiments 3, 6 and 7) was accomplished with a mixture having HEDP:DETPMP (active agent content) of 3:1 by weight. Experiments 3, 7 and 8 testing was accomplished with a 1:3 ratio of HEDP:DETP.

EXPERIMENT 1

Iron Complexing Capacity (Chelation)

Reagents:

Add 48.41 g $FeCl_3\cdot 6H_2O$ to a 1-liter volumetric flask. Fill with deionized water to mark.

Procedure:

Add 5 g (actives) of inhibitor to a 500 ml vol. Flask. Fill with deionized water to mark.

Add 10 ml of inhibitor solution to a 150 ml beaker, dilute with 80 ml di-water. (repeat to ~5 beakers)

To each separately prepared dilution beaker, a different volume (ml) of the $FeCl_3$ solution is added. (1 ml $FeCl_3$ soln.=100 ml $Fe^{+++}$/g in test).

Ph is adjusted to needed value with 0.1N NaOH or Hcl. (Ph=12.0 for the present data).

Transfer each beaker quantitatively to a separate 250 ml round bottom flask. Boil the solution for 1 hour under reflux conditions.

Evaluate the solutions: fail if precipitate is present.

Start test with wide range of Fe added (100 to 500 mg). then once mg Fe complex is known, start test over with a narrower A range (400–500 mg etc.).

Results:

For HEDP and DETPMP used alone, they each were able to complex less than 100 mg Fe per gram of active substance. However, the 3:1 (by weight) mixture of HEDP:DETPMP complexed more than 450 mg Fe per gram.

EXPERIMENT 2

Iron/Mn Complexing Capacity (re: Red/Black Water Prevention)

In municipal potable water systems, it is universal that chlorine is added to sterilize the water. However, this can often result in the formation of so-called red water (iron oxide precipitate) or black water (manganese oxide precipitate). The following shows relative effectiveness to prevent this problem.

Reagents etc.:

1 liter of deoxygenated deionized water $FeSO_4\cdot 7H_2O$ $MnSO_4\cdot H_2O$

Sodium hypochlorite 125 ml glass jars with lids vacuum pump filter paper, 0.45 micron Procedure:

1) make a solution of 200 ppm Fe(II) and 100 ppm Mn (II) using the deoxygenated deionized water.

2) using a jar, to 99 ml deionized water add 1 ml Fe/Mn solution (giving 2 ppm Fe and 1 ppm Mn) (Note: amount of water added to jar needs to be varied to keep the total volume of the jar at 100 ml. EXAMPLE: 98 ml water, 1 ml Fe/Mn solution, 1 ml inhibitor)

3) add inhibitor to needed test amount, mix 4) add 2 ppm chlorine to test mixture, mix 5) under vacuum, filter the mixture 6) compare the filter paper to determine test results:
   a) all clean—amount of inhibitor can be lowered; retest
   b) a brown residue—amount of inhibitor needs to be increased; retest Results:

At 0.8 ppm: There was a light residue on the filter paper for HEDP; a moderate residue on the filter paper for DETPMP and no residue visible for the 3:1 by weight invention blend of HEDP:DETPMP. The invention blend did not show a light residue similar to that shown at 0.8 ppm for HEDP, until the level of testing was reduced to 0.7 ppm.

EXPERIMENT 3

Calcium Sequestration by the Oxalate Method

Reagents:

4% ammonium oxalate 0.25 M (44.1 g/L) calcium acetate

1 N NaOH

Procedure:

1. Weigh accurately 1 gram of phosphonate compound (active basis) and dissolve in approximately 150 ml deionized water.

2. Adjust pH to about 8 with 1 N NaOH.

3. Add 5 ml 49 ammonium oxalate.

4. Adjust pH to 11.0 and dilute to 200 ml total volume.

5. Titrate with calcium acetate in 0.5 ml increments to a distinct and permanent turbidity endpoint. Maintain pH at 11.0±0.1 with 1 N NaOH during the titration. Stir between increments, but not during the actual addition.

Calculation:

$$\text{mg } CaCO_3/g \text{ active sequestrant} = \frac{25.0 * (\text{ml titrant})}{\text{sample weight (g)}}$$

Results:

HEDP=625 mg Ca/gram active.

DETPMP=575 Ca/gram active.

HEDP:DETPMP (3:1)=778 mg Ca/gram active.

HEDP:DETPMP (1:3)=797 mg Ca/gram active.

EXPERIMENTS 4 AND 5

$CaCO_3$ Threshold Inhibition

Following the NACE T-3A-8f protocol (a variation of the static bottle test well known in the industry), two series of tests were run at pH=9.1, 20 hours, 54° C. Experiment 4 was run with 300 ppm Ca and 300 ppm M-alk as $CaCO_3$; Experiment 5 was run with 600 ppm Ca and 600 ppm M-alk as $CaCO_3$.

For commercial purposes, a 90% inhibition dosage level is desirable. Tests at 5, 15 and 25 ppm active compound were run.

In Experiment 4, the inventive 3:1 mixture reached 88% inhibition at 5 ppm active and 95% inhibition at 15 ppm active. HEDP only reached 78% inhibition and 81% inhibition at 5 and 15 ppm respectively. Only when concentration reached 25 ppm did HEDP show a reading above 90% (92%). DETPMP showed similar, although slightly higher results of 82%, 87% and 96% for 5, 15 and 25 ppm active, respectively.

In Experiment 5, where higher amounts of Ca and M-alk were used (double the Experiment 4 levels), HEDP and DETPMP were both slightly more efficient than the blend (57% and 48% versus 43% respectively) at 5 ppm; none of these inhibition levels, though, are close to being acceptable. However, the dosage profile revealed that, with increasing amounts, the blend quickly exceeded the other two in effectiveness so that at 25 ppm, the inventive mixture reached 81%, which is much closer to the desirable 90% level than was reached by the other two, which converged on a value of 67% for 25 ppm active.

EXPERIMENT 6

$BaSO_4$ Threshold Inhibition

In a test analogous to that of Experiments 4 and 5, a series of static bottles were run at 190 ppm Ba, 1800 ppm $SO_4$, pH 7, 24 hours, 90° C. Dosages of 5, 10, 25 and 50 ppm were studied, with the same 90% inhibition level deemed acceptable. A concentration of 25 ppm DETPMP yielded 93% inhibition, no dosage of HEDP exceeded 90%, while the 3:1 HEDP:DETPMP mixture gave 93% inhibition at 10 ppm.

EXPERIMENT 7

Barium Sulfate Test Method (1) (Described in U.S. Pat. No. 5,755,972)

The test method described in U.S. Pat. No. 5,755,972 for barium sulfate inhibition in "forties" formation water (Example 3B) was followed to determine relative inhibitory ability to inhibit barium sulfate scale under these high brine conditions.

Briefly, the test method for measuring inhibition of barium sulfate consisted of the following steps:

(1) preparation of test solutions containing the inhibitor to be tested;

(2) incubation of the test solutions; and (3) measurement of the amount of barium which did not precipitate in the test solutions.

Accordingly, in comparing two test solutions, it is considered that the test solution having the higher percent barium sulfate inhibition contains a scale inhibitor which is more effective in inhibiting metal sulfate scale formation.

Each ion-containing solution is prepared as shown in Table 1.

TABLE 1

| Barium-Containing Solution | | Sulfate-Containing Solution | |
| --- | --- | --- | --- |
| Component | grams/liter | Component | grams/liter |
| NaCl | 74.17 | NaCl | 23.955 |
| KCl | 0.71 | KCl | 0.88 |
| $CaCl_2.2H_2O$ | 10.31 | $CaCl_2.2H_2O$ | 1.57 |
| $MgCl_2.6H_2O$ | 4.215 | $MgCl_2.6H_2O$ | 11.44 |
| $BaCl_2.2H_2O$ | 0.448 | $SrCl_2.6H_2O$ | 0.0243 |

TABLE 1-continued

| Barium-Containing Solution | | Sulfate-Containing Solution | |
| --- | --- | --- | --- |
| Component | grams/liter | Component | grams/liter |
| $SrCl_2.6H_2O$ | 1.745 | $Na_2SO_4$ | 4.375 |
| $Na_2SO_4$ | 0.017 | $NaHCO_3$ | 0.17 |
| $NaHCO_3$ | 0.685 | deionized water | balance |
| deionized water | balance | | |

Each test solution is mixed, then filtered through a 0.45 micron filter and pH adjusted to 4.0 with 15% HCl.

Ca=1620, Mg=936, Ba=126, Sr=290, $HCO_3$=311, $SO_4$=1485, all as mg/L; Cl=36 g/L, 90° C., pH=4.0, 24 hour test period.

No buffer is used in this test. For experimental controls, a barium control solution and a blank were prepared. Analysis solutions are made by adding 10 ml of each supernatant to a 100 ml volumetric flask and adding deionized water to the mark. The analysis solutions are then run on the ICP spectrometer.

All other test parameters are the same as in the "Miller" test procedure.

Once all of the barium numbers are determined, the following was used to calculate the $BaSO_4$ inhibition.

% $BaSO_4$ inhibition=100(Ba found−blank)/Ba control−blank))

The results at 30 mg/l active inhibitor, showed an inhibition for HEDP of 0.3%; DETPMP of 5.7% and a blend of 1 HEDP and 3 DETPMP of 29.8%.

EXPERIMENT 8

Barium Sulfate Test Method (2) (Described in Example 3A, "Miller" in U.S. Pat. No. 5.755,972)
Following the same procedure as described for Experiment 7, the following tests were run.

Each ion-containing solution is prepared as shown in Table 2.

TABLE 2

| Barium-Containing Solution | | Sulfate-Containing Solution | |
| --- | --- | --- | --- |
| Component | grams/liter | Component | grams/liter |
| NaCl | 59.574 | NaCl | 59.574 |
| KCl | 5.663 | $Na_2SO_4$ | 3.993 |
| $CaCl_2.2H_2O$ | 9.310 | $NaHCO_3$ | 0.171 |
| $MgCl_2.6H_2O$ | 13.209 | deionized water | balance |
| $BaCl_2.2H_2O$ | 1.903 | | |
| $SrCl_2.6H_2O$ | 1.402 | | |
| deionized water | balance | | |

Each ion-containing solution is mixed, then filtered through a 0.45 micron filter. The barium-containing solution was adjusted to pH 4.2 with dilute HCl, and the sulfate-containing solution was adjusted to pH 6.0 with dilute HCl.

Composition of the buffer solution is:

| Buffer Solution | |
| --- | --- |
| Component | Concentration |
| $CH_3COOK.3H_2O$ | 16.44 g/100 ml solution |
| $CH_3COOH$ | 0.574 g/100 ml solution |
| Deionized water | balance |

The composition of the inhibitor solutions equals 8000 mg/L active. Then, each inhibitor solution is pH adjusted to 6.0 with dilute HCl or NaOH.

Test solutions:

Ca=1269, Mg=790, Ba=535, Sr=231, $HCO_3$=62, $SO_4$=1350, all as mg/L; Cl=42.5 g/L, 90° C., 24 hour test period, pH=5.5.

The test solutions containing an inhibitor to be tested were prepared by combining 2 ml of the buffer solution, 50 ml of the sulfate-containing solution, 4.0 ml total inhibitor solution, and 50 ml of the barium-containing solution. To vary the concentration of inhibitor tested, an amount of inhibitor is added to the test solution and deionized water is added to make the total amount added 4.0 ml. Example: 4.0 ml of an 8,000 mg/L inhibitor solution=301 mg/L total inhibitor (8000 mg/L)(4 ml)=(106 ml total)(x); to get 100 mg/L inhibitor test solution use 1.3 ml of 8000 mg/L inhibitor solution and 2.7 ml deionized water (8000 mg/L)(1.3 ml)=(106 ml total)(x), thus keeping the total volume of the test solution to 106 ml.

For experimental controls, a barium control solution, sulfate control solution, and a blank were prepared. The blank was made by combining 2 ml buffer, 50 ml sulfate-containing solution, 50 ml barium-containing solution, and 4 ml of deionized water. The barium control was prepared by combining 2 ml buffer, 100 ml barium-containing solution, and 4 ml deionized water. The sulfate control was prepared by combining 2 ml buffer, 100 ml sulfate-containing solution, and 4 ml deionized water.

The test inhibitor solutions and controls are prepared and then placed in an oven at 90° C. for 24 hours.

The solutions are then prepared for analysis by adding the following to a 100 ml volumetric flask:

1) 50 ml EDTA solution: 6.0 g KCl 72.8 g $K_2EDTA.2H_2O$ 1800 g deionized water pH adjust to 12.0 with KOH pellets
2) 1 ml supernatant from the test solution: balance to 2000 g with deionized water
3) EDTA solution to the 100 ml mark The solutions are then tested for barium using ASTM protocol for determination of barium using an ICP spectrometer.

After all of the barium numbers are determined, the following was used to determine % $BaSO_4$:

% $BaSO_4$ inhibition=100((Ba found−blank)/(0.5(Ba control+$SO_4$ control)−blank))

The results show that DETPMP is better than HEDP with a range of about 45–58% inhibition versus 23 to 26% inhibition in the range of 200–300 mg/L actives. In the same range of actives, a 1:3 blend of HEDP:DETPMP showed inhibition of about 68 to 76%.

DISCUSSION

Processes of treating aqueous systems to prevent precipitation of dissolved metal ion species of one or more metals selected from the group consisting of Ca, Mg, Ba, Cu, Fe, Mn and Zn according to the present invention are an improvement to known processes wherein the improvement involves introducing 0.5 to 15000 ppm (or mg liter) of a synergistic mixture of HEDP and DETPMP into the water system. For most purposes amounts up to 100 ppm are sufficient. Amounts up to and possibly higher than 500 ppm (500 mg/liter for high brine concentrations) of the synergistic mixture may be useful for example in certain high scaling oilfield application and up to about 15000 ppm in special circumstances such as lumber milling water.

Known processes include those wherein the aqueous system is potable water treated with chlorine and/or other oxidizing agent as a sterilizing agent and the improvement involves introducing 0.5 to 10 ppm of said synergistic mixture into the water system. These systems include swimming pools, and municipal water supplies.

Where the aqueous system is a high scaling system, the process includes introducing larger amounts such as 5 to 50 ppm of said synergistic mixture into the system. These systems include boilers; heat exchange systems; aqueous systems being desalinated by a process based on evaporative distillation; mining circuit systems, for the recovery of metals or metallic minerals; geothermal well systems used for energy production; and aqueous systems used in an oilfield, either downhole or topside.

Where the aqueous system is a system treated with household, industrial and institutional (HI&I) detergents and cleaning compounds, the process involves introducing 1.0 to 50 ppm of the synergistic mixture into the aqueous system. These include brewtank and bottlewash compounds used in the beer brewing industry; and aqueous systems used in an oilfield, either for downhole or topside treatment.

Other processes using amounts in the 0.5 to 50 ppm range include aqueous systems of photographic chemicals, fertilizer or plant nutritional supplement delivering chelated micronutrients and the aqueous system containing an alkaline peroxide solution for the bleaching of pulp.

In systems with high requirements, such as wherein there is a solid product or slurry and metal chelation is required, the process involves introducing 1 to 100 ppm (or mg/liter) of the synergistic mixture. These systems include concrete preparation for cement wherein the synergistic mixture is added in an amount sufficient to function as a set retarder.

Another high requirement system is the aqueous system used in a bar soap manufacturing process. The synergistic mixture is added to such a system in an amount sufficient to function as a preservative for the bar soap.

Some oilfield applications require concentrations of up to about 500 mg/liter of the synergistic mixtures in the aqueous system being treated. In general, wherein the aqueous system is an aqueous fluid being present in or produced from an underground petroleum-bearing formation, the invention involves introducing into the aqueous fluid 50 to 500 mg/liter of the synergistic mixture. Aqueous fluid encountered in this environment is often acidic with a pH of about 5.5 or less and amounts of barium, calcium, strontium and sulfate ions of from 100 to 2000 parts per million, 300 to 35000 parts per million, 100 to 1000 parts per million, and 500 to 15000 parts per million, respectively (wherein the amounts are parts per million by weight of the aqueous fluid). More usually barium, calcium, strontium and sulfate ions are present in amounts from 300 to 1500 parts per million, and 1000 to 3000 parts per million, respectively (wherein the amounts are parts per million by weight of the aqueous fluid).

In an oilfield "squeeze" operation, the required concentration of synergistic mixture is attained by injecting a concentrated solution of the synergistic mixture into the underground petroleum-bearing formations via a well bore in fluid communication with the underground petroleum-bearing formations. The amount to be used is determined by usual considerations of the nature of the formation rock. The synergistic mixture is absorbed within a matrix of the underground petroleum-bearing formations and then desorbed from the matrix into the aqueous fluid in amounts sufficient to provide the desired concentration of 50 to 500 mg/liter in the aqueous system being treated. If, for example, the formation is of hard rock in which the solution does not absorb well (granite, quartz, etc.) the use of higher amounts is a waste as there is not much absorption. To get he desired results requires more injections over shorter periods of time. For softer or more porous rock (e.g. sandstone) more of the mixture can be used as it will be absorbed.

The amount of synergistic mixture in the injected aqueous solution used to treat the formation rock is usually from 0.5 to 20% by weight of the aqueous solution, preferably from 2 to 10% by weight of the aqueous solution, for most purposes. The injections are repeated on the basis of monitoring of the effluent water from the well. Injection of additional aqueous solution of the synergistic mixture into the underground petroleum-bearing formations will be at time intervals selected to provide desorption of amounts of the synergistic mixture effective to maintain scale inhibition.

Another example of extreme conditions are those that occur in the water used in the cutting of lumber from trees. Because of the extreme conditions, amounts up to 15000 ppm for example 500–15000 preferably 2000–10000 ppm typically about 8000 ppm are used. The high scaling conditions in this use occur, not from "high brine" concentrations but from metal dissolution that occurs because of the low pH of the water in contact with iron equipment. The low pH is caused, inter alia from tannic acid in the wood. Metal can dissolve from the cutting and handling equipment and without some "scale" control, the iron can precipitate as dark stains on the lumber. Concentrations of about 8000 ppm provide a balance between effective for stain control and costs.

As would be obvious to persons working in this field, modifications and variation of the invention as hereinbefore set forth can be made without departing from the spirit and scope thereof and therefore only such limitations should be imposed as are indicated by the appended claims.

What is claimed is:

1. In a process of treating aqueous systems to prevent precipitation of dissolved metal ion species of one or more metals selected from the group consisting of Ca, Mg, Ba, Cu, Fe, Mn and Zn, the improvement wherein the aqueous system is a timber treatment solution and the process comprises introducing 500 to 15000 ppm of a synergistic mixture of HEDP and DETPMP into the aqueous system.

2. The process of claim 1, wherein the mixture of HEDP and DETPMP is in a ratio by weight of from 4:1 to 1:5.

3. The process of claim 1, wherein the mixture of HEDP and DETPMP is in a ratio by weight of from (4 to 2):1.

4. The process of claim 1, wherein the mixture of HEDP and DETPMP is in a ratio by weight of from 1:(4 to 2).

5. The process of claim 1, wherein the mixture of HEDP and DETPMP is in a ratio by weight of 3:1.

6. The process of claim 1, wherein the mixture of HEDP and DETPMP is in a ratio by weight of 1:3.

7. The process of claim 1, wherein 2000 to 10000 ppm of the synergistic mixture are introduced into the aqueous system.

8. The process of claim 7, wherein the mixture of HEDP and DETPMP is in a ratio by weight of from 4:1 to 1:5.

9. The process of claim 7, wherein the mixture of HEDP and DETPMP is in a ratio by weight of from (4 to 2):1.

10. The process of claim 7, wherein the mixture of HEDP and DETPMP is in a ratio by weight of from 1:(4 to 2).

11. The process of claim 7, wherein the mixture of HEDP and DETPMP is in a ratio by weight of 3:1.

12. The process of claim 7, wherein the mixture of HEDP and DETPMP is in a ratio by weight of 1:3.

13. The process of claim 1, wherein about 8000 ppm of the synergistic mixture are introduced into the aqueous system.

14. The process of claim 13, wherein the mixture of HEDP and DETPMP is in a ratio by weight of from 4:1 to 1:5.

15. The process of claim 13, wherein the mixture of HEDP and DETPMP is in a ratio by weight of from (4 to 2):1.

16. The process of claim 13, wherein the mixture of HEDP and DETPMP is in a ratio by weight of from 1:(4 to 2).

17. The process of claim 13, wherein the mixture of HEDP and DETPMP is in a ratio by weight of 3:1.

18. The process of claim 13, wherein the mixture of HEDP and DETPMP is in a ratio by weight of 1:3.

* * * * *